Oct. 21, 1930.　　　O. C. BELOIN　　　1,778,995
TRIMMER
Filed Oct. 8, 1928
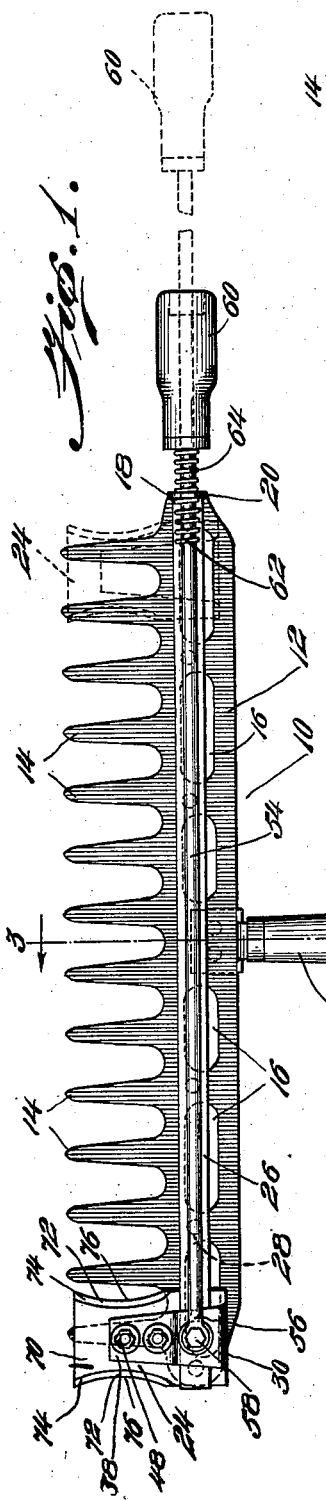
Inventor
Onesime C. Beloin
By Thomas A. Jenckes Jr.
Attorney Patented Oct. 21, 1930

1,778,995

UNITED STATES PATENT OFFICE

ONESIME C. BELOIN, OF RIVERSIDE, RHODE ISLAND

TRIMMER

Application filed October 8, 1928. Serial No. 311,009.

My invention relates to trimmers, particularly of the type adapted to trim the tops and sides of hedges. As is well known the twigs projecting from the ends of hedges are quite strong and it often requires a strong cutting stroke to cut them off. In order that a relatively greater force may be exerted on the ends of said larger twigs to suitably cut them off I provide a trimmer of a general type of a power mowing machine having a stationary blade having a plurality of equidistantly spaced teeth projecting therefrom, but instead of having a reciprocatable blade as in a mowing machine having a similar plurality of upstanding teeth adapted to reciprocate across one stationary tooth only, I preferably provide a single cutting tooth and provide manual means to reciprocate said tooth across a plurality of the stationary teeth. It is obvious, if desired in place of providing a single reciprocatable cutting tooth I may employ a plurality of cutting teeth spaced a much greater distance apart than the distance between the fixed teeth on the stationary blade in order to provide a proper cutting force for this purpose.

A further object of my invention is to provide a trimmer particularly adapted for trimming hedges, of simple and light construction and in which the height and relationship of the cutting tooth to the fixed teeth may be readily adjusted.

In order to prevent the ends of twigs from sliding out between the triangular fixed teeth I preferably construct my reciprocable cutting tooth in a novel manner. I preferably provide it with a flat top and with concave sharpened cutting side edges.

These and such other objects of my invention as may hereinafter appear will be best understood from a description of the accompanying drawings which illustrate an embodiment thereof.

In the drawings, Fig. 1 is a rear elevation of a hedge trimmer constructed in accordance with my invention showing in full lines the cutting tooth and operating handle at the outer end of a cutting stroke and in dotted lines said cutting tooth and operating handle at the inner end of a cutting stroke.

Fig. 2 is a plan view thereof.

Fig. 3 is a sectional view thereof taken along the line 3—3 of Fig. 1 with the cutting tooth moved to center position above the handle.

In the drawings, wherein like characters of reference indicate like parts throughout, 10 generally indicates a hedge trimmer constructed in accordance with the principles of my invention. 12 generally indicates the elongated stationary blade thereof having the pointed preferably triangular teeth 14 projecting upwardly therefrom perferably equidistantly spaced. In the description and claims I refer to the hedge trimmer in the position shown in Fig. 1 of the drawings. In order that the stationary blade 12 may be as light as possible I preferably provide the plurality of cut out portions 16 in the lower end thereof. To provide means for the reciprocatable cutting tooth handle to rest on, I provide suitable guide means therefor on the inner end of the stationary blade 12, in my preferred embodiment said means comprising the lug 18 projecting rearwardly from the inner end thereof having a hole 20 therein. To suitably grasp the stationary blade 12 and hold it in the desired position adjacent the hedge I provide it with the handle 22 projecting downwardly from substantially the center thereof, preferably as shown obliquely rearwardly from the vertical plane of the stationary blade 12 in order that the stationary blade may be held in the desired flat relationship to the hedge being trimmed and the hand grasping the handle 22 kept out of the way of the hedge. As stated, I provide a reciprocatable cutting tooth 24 reciprocable on said stationary blade 12 and I provide a suitable guideway 26 attached to the rear side of said stationary blade 12 on which said tooth 24 may reciprocate. While any suitable type of guideway may be provided for this purpose in my preferred embodiment I preferably construct the guideway 26 as follows: I provide a flat narrow guide plate 26 substantially the length of the stationary blade 12 attached to the rear side of said blade in parallel offset relationship thereto. As shown in Fig.

3 the guideway comprises a T-shaped plate attached to the stationary blade 12 at suitable intervals by the screws 28 extending through the T-base thereof. I provide the guide 30 having the front wall 32 overlapping the front edge of the lower end 34 of the guide plate 26, a curved lower edge 36 surrounding the lower end of the guide plate and a rear wall 38 overlapping the rear side of said guide plate to above the center line thereof having the vertically spaced slots 40 therein near the upper end thereof.

The reciprocatable cutting tooth 24 is suitably mounted on said guide 30 and is preferably contained between said stationary blade 12 and the guide rear wall 38 and is firmly attached to said guide 30. The tooth 24 is preferably of a height to extend substantially to the top of said stationary blade. The tooth 24 is also provided with a plurality of vertically spaced holes 42 and I provide the screws 44 which project rearwardly through said holes 42 in the tooth 24 having the heads 46 thereof suitably countersunk in the front side of said tooth and through said slots 40 in said guide 30 and I provide the nuts 48 attached to the rear ends of said screws 44 for attaching said tooth to said rear guide wall vertically adjustably in said slots 40. It is thus obvious that by unscrewing the nuts 48 the tooth 24 may be adjustably attached to said guide 30 at any desired height preferably so that the flat lower end 50 of said tooth will always ride flat against the upper edge 52 of the T-base of the guide 26 to non-rotatably align said tooth in a horizontal position. It is also obvious that the two vertically spaced bolts 44 prevent the tooth 24 from turning and that the upper and lower T-arms of said guide plate 26 prevent said guide 30 from forward or rearward movement.

To reciprocate said tooth 24 on said guide means 26 I provide the cutting tooth operating rod 54 having the outer end 56 thereof suitably attached to said guide 30 by means of the bolt 58, which extends through the hole 20 in the guide lug 18 in the inner end of the stationary blade 12 and terminates in the operating handle 60 at the inner end thereof. It is thus obvious that in use one hand may hold the handle 22 to hold the stationary blade 12 in the desired cutting relationship with the hedge and that the cutting tooth 24 may be reciprocated on said guide 26 across a plurality of said stationary teeth 14, in the embodiment shown along the whole length of the guide 26 by the other hand grasping the handle 60 and moving it in and out from full to dotted line positions shown in Fig. 1 and vice versa. To ease the action of the handle 60 striking the inner side of the lug 18 and the guide 30 striking the outer side thereof I suitably mount on said operating rod on each side of said lug 18 the helical buffer springs 62 and 64, the spring 62 being mounted on said rod 54 on the outer side of said lug 18 to ease the action between the guide 30 and said lug 18 and the spring 64 being mounted on said rod on the inner side of said lug 18 to ease the action between the outer end of the handle 60 and the inner side wall of said lug 18.

While the reciprocatable cutting tooth 24 may be of any desired shape triangular or otherwise, I preferably construct it of the novel shape shown having the flat top edge 70 terminating at substantially the top of the stationary teeth 14 when suitably mounted on the trimmer and the concave sharpened cutting side edges 72. It is obvious that in use the upper ends 74 of the concave side edges 72 will prevent the ends of the twigs from sliding out between the stationary teeth 14 and will operate to retain them within the spaces between said teeth 14 so as to permit the center portions 76 of the concave cutting side edges 72 to cut the ends of said twigs off.

It is obvious that I have provided a novel type of trimmer easy to operate and simple to construct which is particularly adapted for use in cutting off the stiff twigs on hedges or in pruning by the reciprocation of a single cutting tooth across a plurality of stationary teeth.

It is understood that my invention is not limited to the specific embodiment shown and that various deviations may be made therefrom without departing from the spirit and scope of the appended claims.

What I claim is:

1. A trimmer, comprising a stationary blade having spaced teeth projecting upwardly therefrom, a lug projecting perpendicularly rearwardly from the inner end thereof having a hole therein, a handle projecting downwardly from substantially the center of said blade, a flat guide plate of substantially the length of the blade attached to the rear side of said blade in parallel offset relationship thereto, a guide having a front wall overlapping the front side of said guide plate, a curved lower edge surrounding the lower edge of the guide plate and a rear wall overlapping the rear side of said guide plate to above the center thereof, a reciprocatable cutting tooth contained between said stationary blade and guide rear wall extending to substantially the top of said stationary blade and firmly attached to said guide and a cutting tooth operating rod having the outer end thereof attached to said guide end extending through said hole in said lug in the inner end of the stationary blade and terminating in an operating handle at the inner end thereof.

2. A trimmer, comprising a stationary blade having spaced teeth projecting upwardly therefrom, a lug projecting perpendicularly rearwardly from the inner end thereof having a hole therein, a handle projecting downwardly from substantially the center of said blade, a flat T-shaped guide plate of substantially the length of the blade attached to the rear side of said blade in parallel offset relationship thereto, a guide having a front wall overlapping the front side of said guide plate, a curved lower edge surrounding the lower edge of the guide plate and a rear wall overlapping the rear side of said guide plate to above the center thereof having spaced slots therein near the upper end thereof, a reciprocatable cutting tooth contained between said stationary blade and guide rear wall extending to substantially the top of said stationary blade, screws projecting rearwardly from said tooth through said slots in the rear guide wall, nuts attached to the rear ends of said screws for attaching said tooth to said rear guide wall vertically adjustably in the slots thereof, and a cutting tooth operating rod having the outer end thereof attached to said guide extending through said hole in said lug in the inner end of the stationary blade and terminating in an operating handle at the inner end thereof.

3. A trimmer, comprising a stationary blade having spaced teeth projecting upwardly therefrom, a lug projecting perpendicularly rearwardly from the inner end thereof having a hole therein, a handle projecting downwardly from substantially the center of said blade, a flat guide plate of substantially the length of the blade attached to the rear side of said blade in parallel offset relationship thereto, a guide having a front wall overlapping the front side of said guide plate, a curved lower edge surrounding the lower edge of the guide plate and a rear wall overlapping the rear side of said guide plate to above the center thereof, a reciprocable cutting tooth contained between said stationary blade and guide rear wall extending to substantially the top of said stationary blade and firmly attached to said guide and a cutting tooth operating rod having the outer end thereof attached to said guide extending through said hole in said lug in the inner end of the stationary blade and terminating in an operating handle at the inner end thereof and buffer springs mounted on said operating rod on each side of said lug.

4. A trimmer for cutting the sides and tops of hedges, comprising a stationary blade having a plurality of spaced teeth projecting upwardly therefrom adapted to receive the projecting hedge twigs between them, guide means projecting rearwardly from the inner end of said blade and a handle spaced rearwardly from the plane of said blade to grasp the trimmer to bring the stationary teeth adjacent the hedge, guide-way means attached to the rear side of said stationary blade, a single cutting tooth slidably mounted on said guideway means and a cutting tooth operating rod having the outer end thereof attached to said tooth engaged with said guide means and terminating in an operating handle at the inner end thereof, whereby on movement of said operating handle said cutting tooth may be reciprocated across the plurality of stationary teeth to effect a sufficient cutting force to cut the twigs.

5. A trimmer for cutting the sides and tops of hedges, comprising a stationary blade having a plurality of spaced teeth projecting upwardly therefrom adapted to receive the projecting hedge twigs between them, guide-way means attached to said blade and a handle spaced rearwardly from the plane of the blade to grasp the trimmer to bring the stationary teeth adjacent the hedge, a single cutting tooth mounted on said guide-way means and manually operable means to reciprocate said cutting tooth longitudinally across the plurality of stationary teeth to effect a sufficient cutting force to cut the twigs.

In testimony whereof I affix my signature.

ONESIME C. BELOIN.